UNITED STATES PATENT OFFICE.

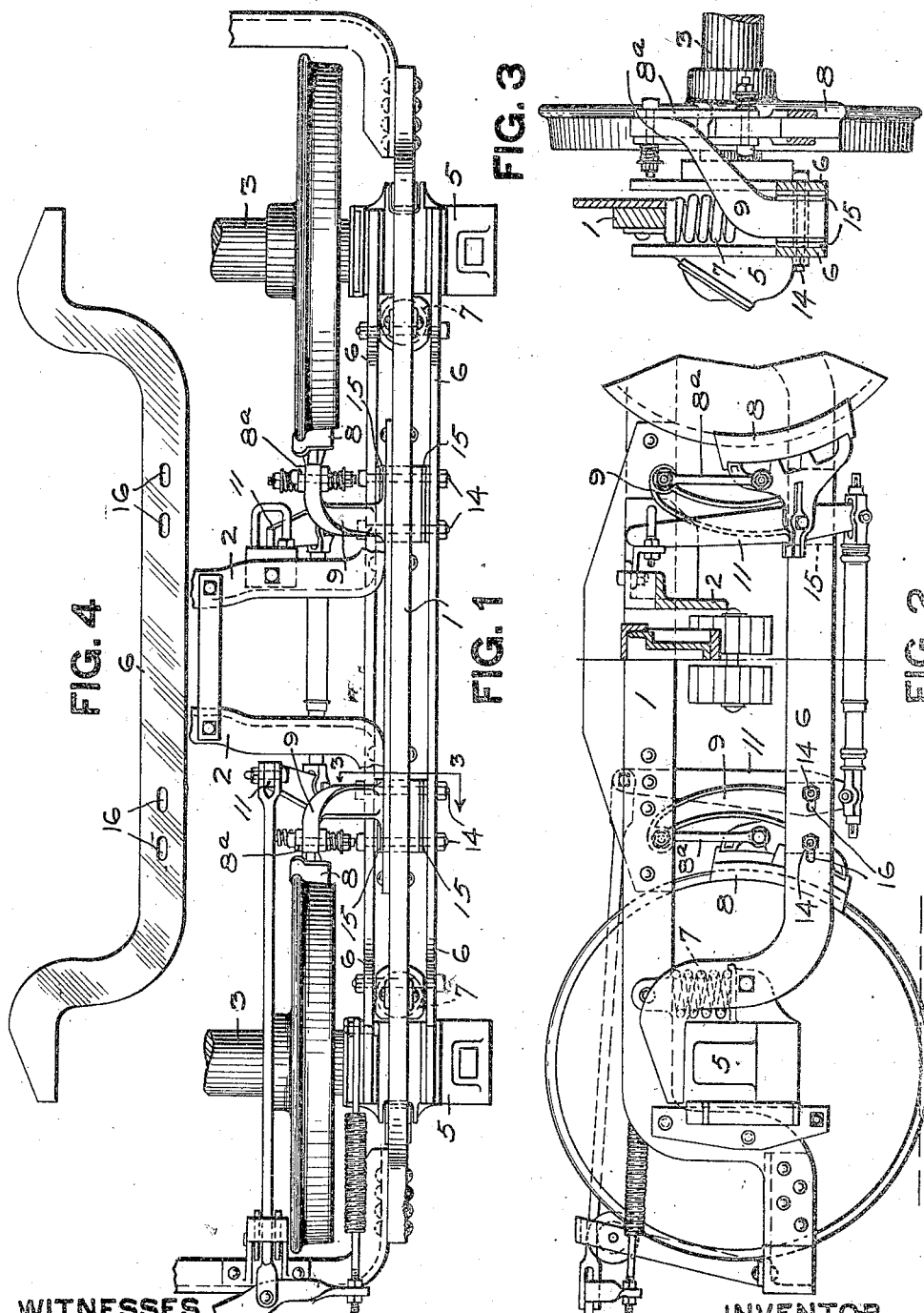

WILLIAM GUNN PRICE, OF NEW CASTLE, PENNSYLVANIA.

BRAKE-SHOE HANGER.

No. 872,541.　　　　　Specification of Letters Patent.　　　　　Patented Dec. 3, 1907.

Application filed August 20, 1906. Serial No. 331,348.

*To all whom it may concern:*

Be it known that I, WILLIAM GUNN PRICE, a resident of New Castle, in the county of Lawrence and State of Pennsylvania, have invented a new and useful Improvement in Brake-Shoe Hangers; and I do hereby declare the following to be a full, clear, and exact description thereof.

This invention relates to motor trucks, and more especially to the brake shoe hanger brackets therefor.

The object of the invention is to preserve the pressure on the brake shoes exactly at the vertical center line of said shoes and also to maintain the inclination of the hangers uniform as the wheels and shoes wear away.

The invention consists, generally stated, in a hanger bracket adjustable in a horizontal plane both parallel to the truck axle and at right angles thereto.

With some forms of motor trucks having inside hung motors, it is necessary to dispense with brake beams. As a consequence there is nothing to hold the brake shoes exactly in line with the wheels. It is, however, necessary that the pressure on the brake shoes should be in the vertical central line of said shoes, so as to make them wear evenly on the wheels. The width of wheel treads and flanges varies and the widths of the shoes must also vary. Consequently the location of the center line of the brake hanger bracket must change with the variation of width of wheels and brake shoes. It is also desirable to adjust the position of a brake hanger bracket so that the hanger will preserve substantially a uniform angle of inclination, even though the wheel should become worn down to a considerably smaller diameter.

To the accomplishment of these objects my invention consists in making the brake hanger bracket adjustable in a horizontal plane, so that it can be adjusted in position both in a direction lengthwise of the axle so as to bring the central line of the hanger in exact line with the center of the brake shoe, no matter what the width of the wheel and the shoe may be, and also adjustable in a direction transversely of the axle so as to compensate for wear on the wheel and preserve the angle of the hanger.

In the accompanying drawings, Figure 1 is a plan view of a portion of a truck showing my invention applied thereto; Fig. 2 is in part a side view and in part a vertical longitudinal section of a truck showing my invention; Fig. 3 is a transverse section on the line 3—3 Fig. 1; and Fig. 4 is a detail side view of one of the equalizer bars.

In the drawings the side frame of the truck is shown at 1 and the transoms at 2. These may be of any desired construction.

3 indicates the axles, 4 the wheels and 5 the journal boxes. Resting on the journal boxes are the equalizer bars 6 and interposed between the same and the side frames are the usual springs 7.

The brake shoes are shown at 8 and hangers at 8ª, these being pivotally connected to the shoes at their lower ends and to the hanger brackets 9 at their upper ends. In the truck shown no brake beams are employed, but each shoe is suspended from a bracket and has directly connected thereto the lever 11, which may be either a dead or a live lever, as the case may be, and connected and operated in the usual way to apply and release the brakes.

In the truck shown the hanger brackets 9 are carried directly by the equalizer bars 6 and entirely independently of the truck frame. The equalizer bars as shown are arranged in pairs, spaced apart, and the lower ends of the brackets 9 extend down into the space between said pair of bars, but are of less width than said space, as shown in Fig. 3. The brackets are rigidly secured to the bars by means of bolts 14, and in order to adjust the brackets sidewise, that is, parallel to the axles of the truck in order to bring the center line of the bracket directly in line with the center line of the brake shoe and wheel, I make use of washers 15 interposed between the bracket and the equalizer bars. By shifting one or more of these washers from one side to the other the bracket 9 can be shifted sidewise so as to bring it exactly in line with the center line of the brake shoe, as will be obvious.

In order to preserve a uniform angle of inclination of the hangers 8 the brackets 9 must be shifted toward and from the wheels. This is conveniently accomplished by making the holes in the equalizer bar 6 through which the bolts 14 pass somewhat elongated or in the form of slots as shown at 16, Fig. 4. Consequently, the hangers can be readily shifted toward and from the wheels, thus preserving a uniform angle of inclination for the hangers.

The construction described is very simple and enables the brake shoe hanger brackets to be shifted in a horizontal plane either parallel to the axles or at right angles thereto. Consequently the hangers can always have a uniform angle of inclination and the brake pressure can be applied directly at the central vertical line of the brake shoes. This insures uniformity of wear and braking pressure.

What I claim is:

1. In a car truck, the combination of the frame, wheels journaled therein, and brake shoe hanger brackets rigidly connected to the frame and adjustable in a horizontal plane both toward and from the wheels and at right angles thereto.

2. In a car truck, the combination of the frame, wheels journaled therein, equalizer bars, and a brake hanger bracket rigidly secured to the equalizer bar and adjustable toward and from the wheels.

3. In a car truck, the combination of the frame, wheels and axles journaled therein, equalizer bars, and a brake hanger bracket rigidly secured to an equalizer bar and adjustable thereon parallel to the axle.

4. In a car truck, the combination of the frame, wheels journaled therein, equalizer bars, a brake shoe hanger bracket rigidly secured to an equalizer bar and adjustable in a horizontal plane both toward and from the wheels and transversely of the frame.

5. In a car truck, the combination of the frame, wheels journaled therein, an equalizer bar consisting of two bars spaced apart, a brake shoe hanger bracket of less width than the space between the bars, a bolt passing through the bars and said bracket, and washers interposed between the bracket and bars.

6. In a car truck, the combination of the frame, wheels journaled therein, and an equalizer bar provided with horizontally arranged slots, a brake hanger bracket, and bolts passing through the slots in the equalizer bar and holes in the bracket and rigidly securing the latter to the equalizer bar.

7. In a car truck, the combination of the frame, wheels journaled therein, an equalizer bar comprising two parallel bars spaced apart and provided with horizontally arranged slots, a brake hanger bracket of less width than the space between said bars, bolts or the like passing through the slots in the bars and holes in the bracket, and washers surrounding the bolts and interposed between the bracket and bars.

In testimony whereof, I the said WILLIAM G. PRICE have hereunto set my hand.

WILLIAM GUNN PRICE.

Witnesses:
ROBERT C. TOTTEN,
J. R. KELLER.